June 11, 1968   C. J. KAWIECKI ET AL   3,388,274
AXIAL SPARK GAP WITH A COAXIAL THIRD ELECTRODE
ADJACENT THE MAIN AXIAL ELECTRODES
Filed April 5, 1966
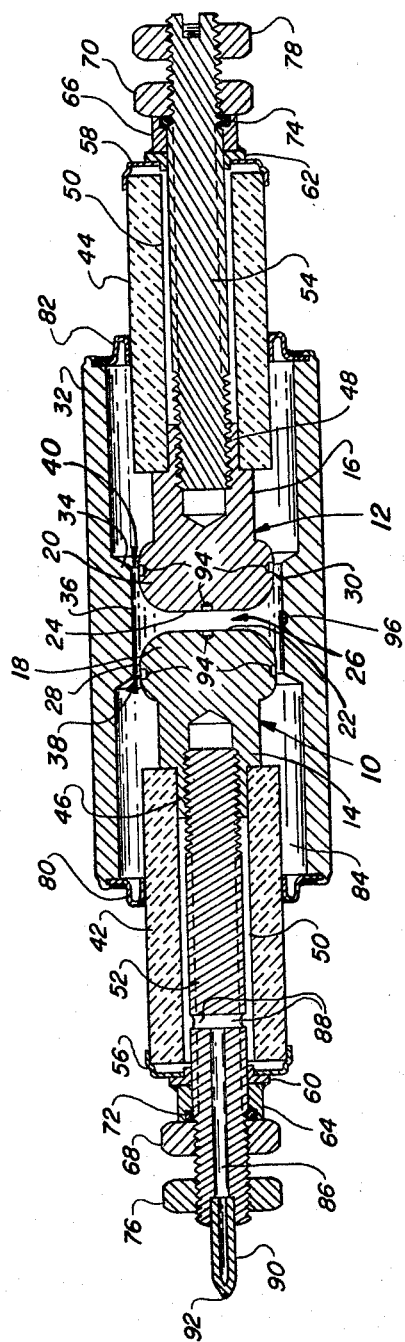
CHESTER J. KAWIECKI
WALTER T. PRANKE JR.
INVENTORS
BY
BUCKHORN, BLORE, KLARQUIST & SPARKMAN
ATTORNEYS 3,388,274
AXIAL SPARK GAP WITH A COAXIAL THIRD ELECTRODE ADJACENT THE MAIN AXIAL ELECTRODES
Chester J. Kawiecki, Santa Barbara, and Walter T. Pranke, Jr., Goleta, Calif., assignors to Joslyn Mfg. and Supply Co., Chicago, Ill., a corporation of Illinois
Filed Apr. 5, 1966, Ser. No. 540,326
12 Claims. (Cl. 313—54)

ABSTRACT OF THE DISCLOSURE

A spark-gap device includes a pair of aligned electrodes and a third cylindrical electrode surrounding the first two. The third cylindrical electrode is extended inwardly towards the aligned electrodes to provide a confined arcing surface, and also to provide structural reinforcement. A pair of cylindrical insulators are respectively received within either end of the cylindrical electrode in spaced relation thereto, and each insulator supports one of the aforementioned aligned electrodes.

---

This invention relates to a spark-gap device and particularly to a spark-gap device of the transient protector type capable of withstanding heavy surges without mechanical distortion.

Spark-gap devices are frequently employed as transient protectors on voltage supply lines for protecting electrical equipment from transient surges. For example, such a spark-gap device may be employed as a lightning arrester providing a breakdown path when a lightning surge occurs. The surge is bypassed to ground via an arc discharge in the arrester and therefore the surge does not reach and destroy electrical equipment also connected to the line.

Many transient discharges, as take place in such devices, occur with explosive force. The force thereof tends to distort and even break apart the protective device, particularly when a heavy surge occurs, and the device is thereafter rendered ineffective for further use. Spark-gap devices are therefore limited in their continued effectiveness by the force they can withstand.

Accordingly, it is an object of the present invention to provide an improved and strengthened spark-gap device capable of rendering protection from high surges without substantial mechanical distortion of the device.

It is another object of the present invention to provide a compact spark-gap device usable for continuous protection against higher current transients than devices heretofore available.

It is another object of the present invention to provide an improved spark-gap device for protection of a voltage supply line, which line is balanced with respect to ground.

It is another object of the present invention to provide an improved spark-gap device which is economical as well as rugged in construction.

Briefly, in accordance with an embodiment of the present invention, an improved spark-gap device comprises a pair of aligned electrodes adapted for connection to the conductors of a voltage supply line. These electrodes are surrounded by but insulated from a grounded cylindrical metal housing extended inwardly to form a third electrode. This construction provides a pair of annular gaps between the cylindrical third electrode and the line electrodes, as well as another gap between the two line electrodes. The foregoing symmetrical arrangement is such that an annular arc occurs between each of the line electrodes and the grounded cylinder and the arc is symmetrical so as to lessen mechanical distortion in the spark-gap device. Also an arc between line electrodes does not distort the device in this symmetrical arrangement.

Not only does the metal cylinder surrounding the line electrodes comprise a third electrode, but also this metal cylinder provides a major portion of a hermetically sealed chamber in the region of the electrodes. This hermetically sealed chamber is suitably supplied with an inert gas, and may also be provided with radioactive material to stabilize the breakdown voltage of the spark-gap device. The electrodes are also suitably provided with a material having a low work function.

The invention, both as to organization and method of operation, together with further advantages and objects thereof, may best be understood with reference to the following description taken in connection with the accompanying drawing wherein the drawing is a cross-section of a spark-gap device according to the present invention.

Referring to the drawing, a spark-gap device according to the present invention includes first and second electrodes 10 and 12 suitably formed of brass. These electrodes include shank portions 14 and 16 of cylindrical cross-section and larger convexly rounded end portions 18 and 20 respectively. The first and second electrodes are aligned in a direction coaxial to shank portions 14 and 16 and present faces 22 and 24 in opposed spaced relationship. Faces 22 and 24 each have a central region which is substantially planar and parallel to the other face such that a gap 26 is formed therebetween having a substantially uniform spacing where the faces 22 and 24 are parallel. Each of the enlarged end portions 18 and 20 curve rearwardly away from gap 26 towards outer peripheries 28 and 30 thereof, which outer peripheries have at least a region where they are substantially cylindrical and coaxial with shank portions 14 and 16. Further rearward, the enlarged end portions 18 and 20 curve back toward shank portions 14 and 16.

Electrodes 10 and 12 are enclosed in a cylindrical metal housing 32 which is coaxially aligned with the electrodes. In the region of enlarged end portions 18 and 20 of electrodes 10 and 12, cylindrical housing 32 is provided with a central cylindrical rib 34 which increases the cross-section of housing 32 in this region. This rib extends inwardly toward the outer peripheries 28 and 30 of the first and second electrodes and has an inner cylindrical surface 36 coaxial with the electrodes 10 and 12 and therefore coaxial with outer peripheries 28 and 30. This inner cylindrical surface 36 is positioned in uniformly spaced circumferential relation with respect to outer peripheries 28 and 30. Therefore, uniformly spaced annular gaps 38 and 40 are established between electrodes 10 and 12 and metal cylindrical housing 32, with cylindrical housing 32 and more especially rib 34 forming a common third electrode for each of these gaps, surface 36 providing the third electrode surface. It is noted that gaps 38 and 40 are larger than gap 26 and therefore gap 26 will tend to break down first. Rib 34 not only functions as a third electrode, but also structurally reinforces the cylindrical housing 32 in the region of the gaps 38 and 40. Housing 32 is suitably grounded by means not shown.

Ceramic insulating cylinders 42 and 44 extend into either end of cylindrical housing 32 and form a part of means for supporting electrodes 10 and 12 axially within cylindrical housing 32. Shank portions 14 and 16 of the electrodes include extension sleeves 46 and 48 received within the cylindrical inner bores 50 of the ceramic cylinders. A pair of threaded rods 52 and 54, of smaller diameter than bores 50, also extend through bores 50 where they are threadably received in shank ends of electrodes 10 and 12.

The ends of ceramic insulating cylinders 42 and 44 remote from the electrodes are provided with annular metal caps 56 and 58 which are secured to the ceramic cylinders, e.g. by soldering to a metallized coating at the outer end of the ceramic cylinders remote from electrodes 10 and 12. Flanged washers 60 and 62, closely receiving rods 52 and 54, have axial portions extending through the central apertures in caps 56 and 58. The flanged washers are hermetically sealed to the caps 56 and 58 as by soldering. Retaining nuts 64 and 66 are tightened down on rods 52 and 54 at this point for the purpose of securing the assembly together. These nuts bear on washers 60 and 62 and are drawn up tightly on rods 52 and 54 thereby firmly securing the electrodes 10 and 12 to the opposite ends of ceramic cylinders 42 and 44 such that the shank portions 14 and 16 bear on the ends of the ceramic cylinders adjacent thereto. After being drawn up tight, nuts 64 and 66 are preferably soldered around the edge thereof to washers 60 and 62.

Threaded rods 52 and 54 extend beyond retaining nuts 64 and 66 where they are further provided with first connecting nuts 68 and 70 which are drawn up towards retaining nuts 64 and 66. Solder seals 72 and 74 are provided around the inner edge of retaining nuts 64 and 66 where the nuts are drawn together for insuring hermetic sealing of retaining nuts 64 and 66 to the rods 52 and 54. Before making solder joint 74 gap 26 can be adjusted by the screwdriver slot on the end of rod 54. Further connecting nuts 76 and 78 are also threadably received on rods 52 and 54 for the purpose of securing electrical conductors thereto (not shown). For example, an electrical conductor connected to one side of a balanced voltage supply line is suitably secured between nuts 68 and 76 while a second conductor connected to the opposite side of the same voltage supply line is suitably secured between nuts 70 and 78.

Ceramic cylinders 42 and 44 are positioned within the ends of cylindrical housing 32 by means of metal bellows 80 and 82 respectively. These metal bellows are soldered to the ends of cylindrical housing 32 and to a perimeter of ceramic cylinders 42 and 44, which are suitably metallized at this point. The metal bellows 80 and 82 securely position the ceramic cylinders and therefore electrodes 10 and 12 within the cylindrical housing 32 in an axial direction, while at the same time allowing for a differential expansion between the ceramic cylinders and the cylindrical metal housing in a radial direction. The metal bellows 80 and 82 complete the hermetic sealing of a chamber 84 interior to cylindrical housing 32 in the region of electrodes 10 and 12.

Chamber 84 is desirably evacuated and then supplied with an inert gas such as argon. For this purpose, rod 52 is provided with an axial bore 86 leading from the outward end thereof to side passages 88 extending radially through the rod. At the outermost end of the rod 52, a hollow metal stem 90 is secured, which communicates to bore 86. Evacuation apparatus is suitably attached to stem 90 in the manufacture of the device according to the present invention after which a suitable inert gas, e.g. argon, is introduced by way of the same stem. After the desired atmosphere is established within chamber 84, the stem is sealed off at end 92 as by soldering.

When a precise breakdown voltage is desired for the spark-gap device according to the present invention, electrodes 10 and 12 are provided with a plurality of small recesses 94 suitably located on faces 22 and 24, and upon cylindrical outer perimeters or peripheries 28 and 30. An additional recess 96 is located in surface 36 of rib 34. The latter contains a radioactive prompter material, for example, radium. The radioactive material provides some ionization before arc discharge, aiding in the forming of a discharge at a stabilized breakdown voltage. The recesses 94 suitably contain a substance having a low work function such as, for example, cesium chloride. The low work function tends to reduce and control the breakdown voltage of the device to a predetermined value.

In the spark-gap device according to the present invention, the first and second electrodes 10 and 12 are suitably connected to the two conductors of a voltage supply system, which may be balanced with respect to ground. These electrodes cooperate with a third electrode provided by cylindrical housing 32, and specifically by reinforced rib 34 thereof, which extends towards electrodes 10 and 12 forming annular gaps 38 and 40 between electrodes 10 and 12 respectively and the surface 36 of rib 34. The cylindrical housing 32 is desirably connected to a neutral ground connection of the voltage supply system, by means not shown. When a voltage surge occurs on the voltage supply line, which surge is higher with respect to ground than a predetermined breakdown voltage of the spark-gap device, as determined inter alia by the spacing of gaps 38 and 40, arcing will take place across gap 38 between electrode 10 and rib 34, or alternatively across gap 40 between electrode 12 and rib 34. The high voltage surge is thereby shunted to ground, protecting other equipment which may be connected to the voltage supply system. Moreover, the gap 26 between electrodes 10 and 12 will also break down as when a surge voltage is present between the voltage supply lines exceeding a predetermined breakdown voltage of gap 26. Breakdown paths are therefore provided between the lines as well as between each line and ground.

The construction of the spark-gap device according to the present invention is such as to withstand high surges without structural failure and is therefore an improvement over spark-gap protective devices of this type heretofore available. The spark-gap device according to the present invention can be employed in continuous service for continued protection against high voltage transients. The ability to withstand high surges is attributable to the present device's advantageously rugged construction.

It is appreciated that discharge breakdowns are apt to produce considerable structural strain upon the spark-gap electrodes and other members of the device, since these discharges frequently occur with explosive force. This force has a tendency towards dislodging or distorting prior art spark-gap devices structurally so that they may no longer be usable. However, in the device according to the present invention, the forces are distributed symmetrically in a symmetrical structural arrangement more capable of withstanding the higher surges. The arc path between each of the electrodes 10 and 12 and the rib 34, i.e., gaps 38 and 40, is annular and symmetrical. The arcs within gaps 38 and 40 symmetrically surround the electrodes 10 and 12 so the force thereof is evenly distributed and is not such as to produce movement or relative movement of the electrodes. The cylindrical grounded outer electrode, in the form of reinforced rib 34, can be moved or distorted only by bursting of the cylinder and is not likely except for extremely heavy discharges. Therefore, the present device is able to continually withstand greater discharges. Moreover, the line electrodes 10 and 12 are symmetrically located in the device and a discharge that takes place therebetween will not dislodge electrodes 10 and 12 since a heavier symmetrical discharge ordinarily taking place within annular gaps 38 and 40 has a centering effect. Because the line connected electrodes may discharge to one another, additional protection is provided therebetween, and the line-to-line discharge structure completes the symmetrical arrangement.

While we have shown and described a preferred embodiment of our invention, it will be apparent to those skilled in the art that many changes and modifications may be made without departing from our invention in its broader aspects. We therefore intend the appended claims to cover all such changes and modifications as fall within the true spirit and scope of our invention.

We claim:
1. A spark-gap device comprising:
    first and second metal electrodes aligned in a first direction and adapted for connection to a pair of voltage supply lines, said first and second electrodes having end portions disposed in aligned space relationship providing a first gap therebetween extending in said first direction,
    a metal cylinder adapted for grounded connection and having an axis in said first direction of alignment of said electrodes, said cylinder surrounding said first and second electrode end portions, said cylinder having a section extending inwardly from said cylinder and opposite the outer perimeters of said first and second electrode end portions to form an inwardly extending rib, said rib providing an inner electrode surface forming second and third annular gaps of predetermined length between the outer perimeters of said end portions and said rib, said cylinder having a larger inner diameter at either end of said rib immediately outside said predetermined length to confine an annular discharge region to the said second and third gaps,
    means for supporting said electrodes axially within said metal cylinder including insulating means separating said first and second electrodes from said cylinder at locations removed from said second and third annular gaps, and
    electrical connection means for said first and second electrodes.

2. The spark-gap device according to claim 1 wherein said cylinder section extending inwardly to form said rib is of greater thickness than said cylinder at either end of said rib for structurally reinforcing said rib with respect to explosive discharges between said electrodes.

3. The spark-gap device according to claim 1 wherein said cylinder, insulating means, and first and second electrodes are sealed to one another to provide a hermetically sealed chamber in the region of said first, second and third gaps, and wherein said cylinder extends longitudinally to surround portions of said insulating means in circumferentially spaced relation, and further including metal expansion bellows sealed between said cylinder and said insulating means permitting radial differential movement between said cylinder and said insulating means.

4. The spark-gap device according to claim 3 further including a deposit of radioactive material within said hermetically sealed chamber.

5. The spark-gap device according to claim 3 further including low work function material disposed on the surface of one of said electrodes.

6. A spark-gap device according to claim 1 wherein said electrode end portions are enlarged toward said cylinder and have opposed surfaces in spaced relation forming said first gap, said end portions having cylindrical portions rearward of the electrode surfaces which form said first gap, said cylindrical portions providing the outer perimeter of said first and second electrodes and providing cylindrical electrode surfaces directly opposite and circumferentially surrounded by said inner electrode surface of said rib so as to form said second and third annular gaps, said cylinder having an inner diameter which is abruptly larger at the ends of said rib and away from said cylindrical electrode surfaces to confine said discharge region to said second and third annular gaps.

7. The spark-gap device according to claim 6 wherein the said surfaces forming said first gap are each at least in part planar where the surfaces face one another providing a region of substantially uniform spacing in said first gap.

8. The spark-gap device according to claim 1 wherein the spacing of said first gap is less than the spacing of said second and third gaps.

9. A spark-gap device comprising:
    first and second metal electrodes aligned in a first direction and adapted for connection between a pair of voltage supply lines, said electrodes having enlarged rounded end portions with cylindrical perimeters coaxial with respect to a common axis of alignment of said electrodes, said end portions being disposed in spaced relation from one another with said end portions having planar area where they face one another to form a first gap therebetween of substantially uniform spacing,
    a metal cylinder adapted for grounded connection having an axis coaxial with said first and second electrodes and with said first direction of alignment of said electrodes, said cylinder surrounding the outer cylindrical perimeter of said first and second electrode end portions in uniformly spaced circumferential relation thereto providing second and third annular gaps between the outer perimeters of said end portions and said metal cylinder, said cylinder forming a third electrode,
    a pair of cylindrical insulators received within and coaxial with said metal cylinder being supported within the ends of said metal cylinder, each of said cylindrical insulators supporting one of said first and second electrodes at an end thereof remote from said first gap, and
    a pair of aligned rods extending through said cylindrical insulators for securing said first and second electrodes to said cylindrical insulators while providing electrical connection to said first and second electrodes.

10. The spark-gap device according to claim 9 wherein said metal cylinder is provided with an internal cylindrical rib in the region of said first and second electrode end portions reinforcing said cylinder and extending inwardly towards the outer cylindrical periphery of said first and second electrode end portions so as to provide a surface of said third electrode, said surface of said third electrode being coaxial with the outer periphery of said first and second electrode end portions and uniformly spaced therefrom.

11. A spark-gap device comprising a first electrode having an enlarged convexly rounded end portion, said end portion having a substantially cylindrical outer periphery,
    a metal cylinder circumferentially surrounding said first electrode, said cylinder having a section of increased thickness extending inwardly opposite the outer periphery of said end portion to form an inwardly extending rib structurally reinforcing said cylinder, said rib providing an inner electrode surface coaxial with the cylindrical outer periphery of said end portion of said first electrode and disposed in uniformly spaced circumferential relation to the outer periphery of said end portion of said first electrode to provide an annular gap therebetween,
    means firmly supporting said electrode within said cylinder including cylindrical insulating means coaxial with said cylinder and extending within an end of said cylinder remote from said annular gap, and
    a metal rod coaxial with said cylinder extending through said cylindrical insulating means for mounting and providing electrical connection to said first electrode.

12. The spark-gap device according to claim 11 wherein said metal rod is smaller in diameter than said electrode and is secured to said electrode on one end thereof while also being secured to an end of said insulating means remote from said electrode.

References Cited

UNITED STATES PATENTS

| | | | |
|---|---|---|---|
| 1,144,029 | 6/1915 | Creighton | 313—325 X |
| 1,294,466 | 2/1919 | Houskeeper | 313—325 X |
| 2,414,622 | 1/1947 | Watrous | 313—325 X |
| 2,449,961 | 9/1948 | Treece et al. | 313—217 X |

FOREIGN PATENTS 738,793  10/1955  Great Britain.

DAVID J. GALVIN, *Primary Examiner.*
JAMES W. LAWRENCE, *Examiner.*
C. R. CAMPBELL, *Assistant Examiner.*